(12) United States Patent
Sohn et al.

(10) Patent No.: US 8,096,520 B2
(45) Date of Patent: Jan. 17, 2012

(54) CONNECTOR SYSTEM

(76) Inventors: Cheryl L. Sohn, San Diego, CA (US);
Douglas C. Sohn, San Diego, CA (US)

( * ) Notice: Subject to any disclaimer, the term of this patent is extended or adjusted under 35 U.S.C. 154(b) by 74 days.

(21) Appl. No.: 12/478,694

(22) Filed: Jun. 4, 2009

(65) Prior Publication Data

US 2009/0304439 A1    Dec. 10, 2009

Related U.S. Application Data

(60) Provisional application No. 61/058,564, filed on Jun. 4, 2008.

(51) Int. Cl.
*F16M 13/00* (2006.01)

(52) U.S. Cl. .......... 248/558; 248/223.31; 248/241; 24/584.1; 24/604; 24/605; 24/697.1; 403/4; 403/287; 403/331; 403/360; 403/381

(58) Field of Classification Search .......... 248/558, 248/477, 220.21, 223.31, 241, 65; 403/4, 403/42, 287, 317, 331, 336, 345, 360, 375, 403/381; 24/605, 401, 403, 404, 406, 453, 24/584.1, 588.1, 589.1, 590.1, 591.1, 593.1, 24/595.1, 596.1, 604, 612, 630, 652, 686, 24/697.1, 701
See application file for complete search history.

(56) References Cited

U.S. PATENT DOCUMENTS

| 718,306 | A | * | 1/1903 | Boring | 279/45 |
| 1,137,542 | A | * | 4/1915 | Schweinburg | 24/578.14 |
| 2,105,213 | A | * | 1/1938 | Clark | 24/595.1 |
| 2,656,550 | A | * | 10/1953 | Loeb | 5/295 |
| 3,313,509 | A | * | 4/1967 | Lockert | 248/244 |
| 4,183,121 | A | * | 1/1980 | Cousins | 24/588.1 |
| 4,437,639 | A | * | 3/1984 | Stein | 248/558 |
| 4,657,442 | A | * | 4/1987 | Krings | 405/282 |
| 4,783,034 | A | * | 11/1988 | Ostrander et al. | 248/221.12 |
| 4,939,819 | A | * | 7/1990 | Moyer | 24/16 R |
| 5,957,421 | A | * | 9/1999 | Barbour | 248/220.21 |
| 5,983,467 | A | * | 11/1999 | Duffy | 24/442 |
| 6,058,577 | A | * | 5/2000 | Ida et al. | 24/306 |
| 6,182,338 | B1 | * | 2/2001 | Watanabe | 24/697.1 |
| 6,364,278 | B1 | * | 4/2002 | Lin et al. | 248/676 |
| 6,494,639 | B1 | * | 12/2002 | Friend | 403/403 |
| 6,659,677 | B1 | * | 12/2003 | Exposito | 403/24 |
| 6,719,260 | B1 | * | 4/2004 | Hart | 248/479 |
| 2003/0051320 | A1 | * | 3/2003 | Fagan et al. | 24/584.1 |
| 2008/0054142 | A1 | * | 3/2008 | Deland | 248/223.31 |
| 2008/0209698 | A1 | * | 9/2008 | Colorado | 24/595.1 |

* cited by examiner

*Primary Examiner* — Terrell McKinnon
*Assistant Examiner* — Bradley Duckworth
(74) *Attorney, Agent, or Firm* — Birch, Stewart, Kolasch & Birch, LLP (57) ABSTRACT

An array of U-shaped flanged brackets and flange tipped posts attached to a supporting surface providing a mechanical connection with an object that is provided with corresponding posts and brackets. The brackets and posts can include electrical contacts or fiber optic contacts for transferring power or signals between connected objects. Various objects can be mounted on the array of brackets and posts to provide positioning flexibility.

25 Claims, 10 Drawing Sheets

CONNECTOR SYSTEM

This application claims the benefit of Provisional Application No. 61/058,564, filed on 4 Jun. 2008.

FIELD OF THE INVENTION

The invention relates to connector systems for creating mechanical, electrical, and optical interconnections between objects and for mounting objects to walls and panels.

BACKGROUND OF THE INVENTION

Devices for making mechanical connections between objects are well known. Such devices include those which are intended to make a permanent connection, such as adhesives, weldments, solder joints, and rivets. Other known devices allow objects to be connected and disconnected repeatedly. One example of the latter is a hook and loop system such as those bearing the tradename VELCRO. Other connector systems involve mushroom-like projections which are inserted into corresponding apertures so as to resist shear movement after insertion. Other connector systems involve an array of apertures and a corresponding array of projections which are forcibly pressed axially into the aperture array. These examples all bear the disadvantage that the strength of the connection depends on the force required for engagement, and the correspondent force required for disengagement. The latter two examples bear the further disadvantage that precise alignment of the objects is required in order to effect the engagement of the connectors.

SUMMARY OF THE INVENTION

Embodiments of the current invention provide a connector system which overcomes the disadvantages of the known systems. One objective of these embodiments is to allow for rapid and repeated engagement and disengagement of the connection of objects without the requirement of precise alignment of the objects. Another objective is to allow for the repeated and rapid adjustment of the relative positions of the objects being connected. A further objective is to allow the connection of planar objects, non-planar objects, rigid objects and flexible objects. Still another objective is to allow the engagement and disengagement of the connection without the requirement for the use of tools. A further objective of embodiments of this invention is to allow for the incorporation of electrical and optical communication between the objects into the structure of the connector system itself.

A connector system for connecting two objects in accordance with the invention comprises a first array of U-shaped flanged brackets and flange tipped posts configured to provide a mechanical engagement with a second array of corresponding brackets and posts. The arrays are preferably affixed to the objects to be connected. One or more U-shaped flanged brackets engages with one or more corresponding flange tipped posts.

Each U-shaped bracket has a flange, or lip, and a recessed region to accept the flange of the post. The engagement occurs by sliding the flange of the post into the recessed region of the U-shaped bracket; the lip retains the flange. By the novel use of a U-shape for the bracket, the flange of the corresponding post will slide into place without the need for precise alignment. Once the edge of the flanged post enters the U-shape of the bracket, the flanged post will, with minor adjustments if needed, slide fully into engagement with minimal force. The bracket and post connectors can be engaged and disengaged by sliding in one direction only. For example, if the first array is oriented vertically with the U-shaped flanged brackets oriented with the concavity open upwardly, the flanged posts of the second array may be engaged and disengaged by sliding vertically after an effective facing engagement.

The strength of the connection is enhanced by providing each array with a mixture of U-shaped brackets and flange tipped posts, correspondingly located so that each U-shaped bracket of the first array will engage with a flange tipped post of the second array, and each U-shaped bracket of the second array will engage with a flange-tipped post of the first array.

The size of the connector elements can be sufficiently small that at least one bracket and one post can be mounted on a typical office or household item. Larger objects can have a larger number of connectors, which provides increased load-bearing capability. An optional locking mechanism prevents the connectors from disengaging. The locking mechanism can be a bar that slides between the rows of connector elements.

The brackets and posts can optionally include electrical contacts for transferring power or signals between connected objects. The brackets and posts can optionally include fiber-optic connections for transferring optical signals between connected objects.

One example of an embodiment of the current invention is an array with rows of alternating brackets and posts, such that sufficient space exists between each row that the brackets and posts on any other such object can slide between the rows and then drop down into the receiving brackets and posts on the first object, thus locking into place.

The array of brackets and posts can be attached to a panel or a wall and to an object intended for mounting to the panel. The connector system provides flexibility in the positioning of objects on the panel and with respect to each other, and easily repositioning them. In one embodiment, the array of brackets and posts is in the form of a panel, which is then mounted to a wall with adhesives, nails, screws or other common fastening means, and then smaller objects such as shelves or cabinets having mating brackets and posts on their back can be mounted on the wall by engaging the connectors with each other. The object mounted can be easily repositioned. An object can have a single bracket or a single post, or can have at least one bracket and one post to provide rotational stability of the object. An object can have multiple pairs of brackets and posts to increase the stability and weight carrying capacity of the mounting connection.

The brackets and posts can be formed from plastic, metal, composite, or any other relatively rigid material, or alternatively the connector elements can be formed from a flexible material. The array of connectors can be planar or conform to a curved or irregular shape, for example, a belt or curved wall. The connector panel can be made of flexible material.

In one embodiment, electrical connectivity is provided by the connectors. Metal contacts can be molded into the brackets and posts, where exposed conductive surfaces create electrical contacts. Alternatively, the contacts can be formed or attached as part of a wiring panel or backplane that aligns with each bracket and post. The wiring panel can be a printed circuit board, with single, dual, or multiple layers. The metal contact can be either integral to the connectors or separate. A pin on the connector or contact can be soldered to the wiring panel using either through-hole or surface mount techniques. The wiring panel can then be attached to rear of the connector panel, with the electrical contacts passing through open holes or slots in the connector panel in such a way that the contacts are adjacent to the corresponding brackets and posts.

The brackets and posts can be molded in modules of any number of connector pairs. The brackets and posts can be integral to the panel or attached to a panel plane. A first portion of the bracket and post connectors can be molded with the connector panel with a second portion of the connectors attached to the first portion. For example, the stem (or shank) of a post can be molded as an integral part of the panel, then the flange attached to the stem using glue, solvent adhesion, heat fusing, ultrasonic welding, screws, or any other means of attachment. Similarly, the lip of the brackets can be attached to the base of the brackets that is molded with the panel.

The brackets and posts collectively form a connector system according to the embodiments of the invention.

BRIEF DESCRIPTION OF THE DRAWING

The objects, advantages and features of the embodiments of the invention will become more apparent from the following detailed description, when read in conjunction with the accompanying drawing, wherein.

DETAILED DESCRIPTION OF THE PREFERRED EMBODIMENTS

Figure 1:
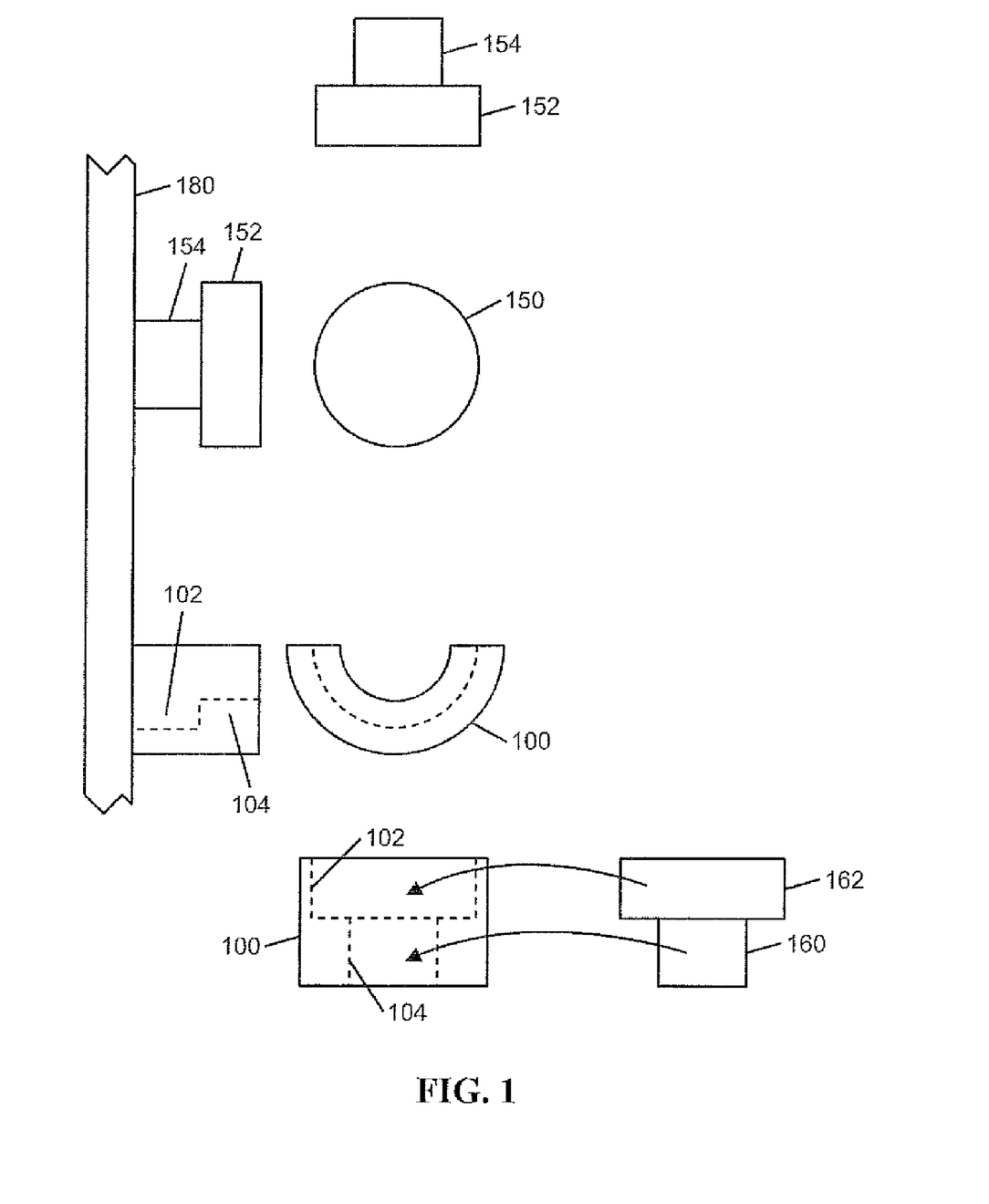
FIG. 1 shows the basic structure of a U-shaped flanged bracket and flange tipped post embodiment in accordance with the invention.

FIG. 1 shows the basic structure of a single U-shaped bracket and a flange tipped post mounted to a panel 180 which serves as a supporting surface. U-shaped bracket 100 has a lip 104 and recessed region 102. Flange tipped post 150 has stem 154 and flange 152. Also shown is a second flange tipped post 160 which can mate with U-shaped bracket 100. Flange 162 attached to mating post 160 engages into recessed region 102 of a bracket and the flange 162 is retained by lip 104. Post 150 similarly can engage with a mating bracket, not shown. Flange tipped post 160 can be attached to an object, so that engagement of the flange tipped post with U-shaped bracket 100 serves to connect the object to panel 180.

One embodiment of U-shaped bracket has the U-shape half-cylindrical and the correspondent flange tipped post cylindrical. However, adherence to purely cylindrical geometry is not a requirement of the invention. This connector system is referred to by the trademark, U-DOT.

Figure 2:
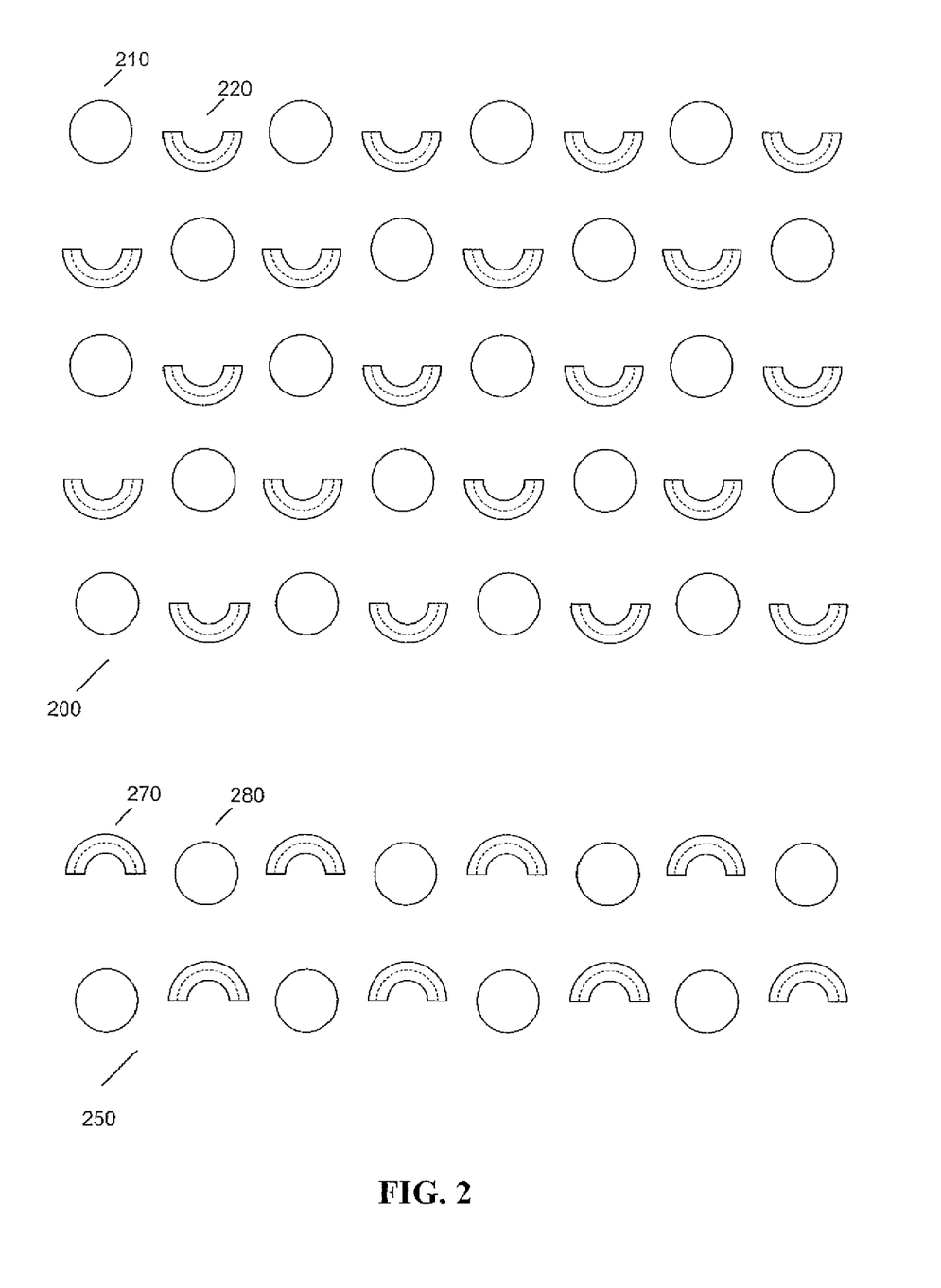
FIG. 2 shows an array of the brackets and posts of FIG. 1 for a panel and for a mounted object.

As an example of the application of this basic structure, an object may be connected to a panel through the use of a plurality of flange tipped posts and U-shaped brackets. FIG. 2 shows an array of brackets and posts for a panel and for the object to be connected to the panel. Array 200 is attached to the panel and has posts and brackets in a regular pattern, where the spacing is preferably uniform horizontally and vertically. Array 250 shows one possible arrangement of corresponding posts and brackets attached to the object to be connected to the panel. Sufficient space is provided between the horizontal rows so that when the object and the panel are in facing relationship, the brackets and posts on the mounted object can slide between them until the desired location is reached and then dropped down into the receiving brackets and posts on the panel, thus locking the object into place. Bracket 270 mounted on the object can engage with post 210 of the panel array, or with any other post in the panel array. Post 280 mounted on the object can engage with bracket 220 or with any other bracket in the panel array. Of course, bracket 270 and post 280 must mate with a respective post and bracket on the panel which are adjacent to each other. Object array 250 can be positioned anywhere in panel array 200. The object can have as few as one post or one bracket. For greater stability of the mounted object, preferably there is at least one each of the brackets 270 and posts 280, and two each adds to the stability and security of the connection.

One novel feature of this embodiment of the invention, demonstrated by the foregoing example, is that the connection is self-aligning. Once the array of U-shaped brackets and flange tipped posts attached to the object to be attached to the panel is moved to a location near the desired location on the panel and moved to begin the engagement of at least two of the flange tipped posts and U-shaped brackets, all of the posts and brackets will move to a fully engaged position with little required force owing to the U-shape of the brackets and the matching cylindrical shape of the posts.

In a preferred embodiment of the invention, the connector elements are of a generally cylindrical shape and are approximately 10 mm in diameter, where the outside diameter of the bracket is about 12 mm and the outside diameter of the post flange is about 8 mm. This size enables typical objects to have multiple bracket and post connector elements to provide a strong bond. However, the connector elements can be made any size to accommodate the size and load requirements of various applications.

The connector elements may be fabricated from any material which offers the strength required by the intended application. For example, metals such as aluminum, steel, or brass may be selected if the strength offered by these metals is needed. Plastics such as fiberglass, thermoplastics, and injectable resins may also be selected. In one embodiment, the U-shaped brackets and flange tipped posts are fabricated by injection molding, and the molded connector elements are attached mechanically or with adhesives to supporting surfaces such as flat panels. Components can be injection molded as individual elements, as multi-connector modules, or as a large panel of connector elements. The connectors can be molded in a strip of one row which then attached to a panel surface. Score lines can be inscribed between each connector pair so the strips can be broken to any length needed.

Brackets and posts may be arranged as regular arrays on the objects to be connected, as shown in FIG. 2. Alternatively, they may be arranged in any geometric pattern desired or appropriate to for a particular application. The arrays of brackets and posts may be attached to supporting surfaces which are in turn attached to the objects to be connected. In this embodiment of the invention, standard supporting surfaces may be manufactured in a variety of sizes and shapes for efficiency, with the selection of the appropriate bracket-and-post array made based on the nature of the objects to be connected.

As shown in FIG. 2 the rows of two dimensionally alternating brackets and posts are aligned, that is, below each bracket is a post and below each post is a bracket. There may be situations where greater mounting flexibility is desired, and alternating rows could be offset so that each post is not directly aligned below each corresponding bracket, for example.

Brackets 100 and posts 150 can be formed as separate elements and attached to panel 180 or they can be molded as part of panel 180. Alternatively, a portion of the connectors can be molded with panel 180. For example the stem 154 and recessed region 102 could be fabricated as part of panel 180. Flange 152 and lip 104 can be molded as separate units and then attached to the molded portion. This approach can simplify the mold for the panel and connector portion, resulting in a two part mold The supporting surfaces to which the brackets and posts are attached may be planar or curved. Alternatively, the supporting surfaces may be comprised of a flexible material such as vinyl or flexible plastic sheeting. In each case, the mating pair of arrays and supporting surfaces must be parallel to each other, or capable of being brought into parallel to each other, to permit engagement of the corresponding brackets and posts.

The connector system which is disclosed may be provided with functionality beyond the mechanical connection of objects by the incorporation of a means for electrical or optical communication between the U-shaped brackets and flange tipped posts which make up the fundamental elements of the invention. Such means of electrical or optical communication will then enable electrical or optical communication between objects being connected using this connector system.

Figure 8:
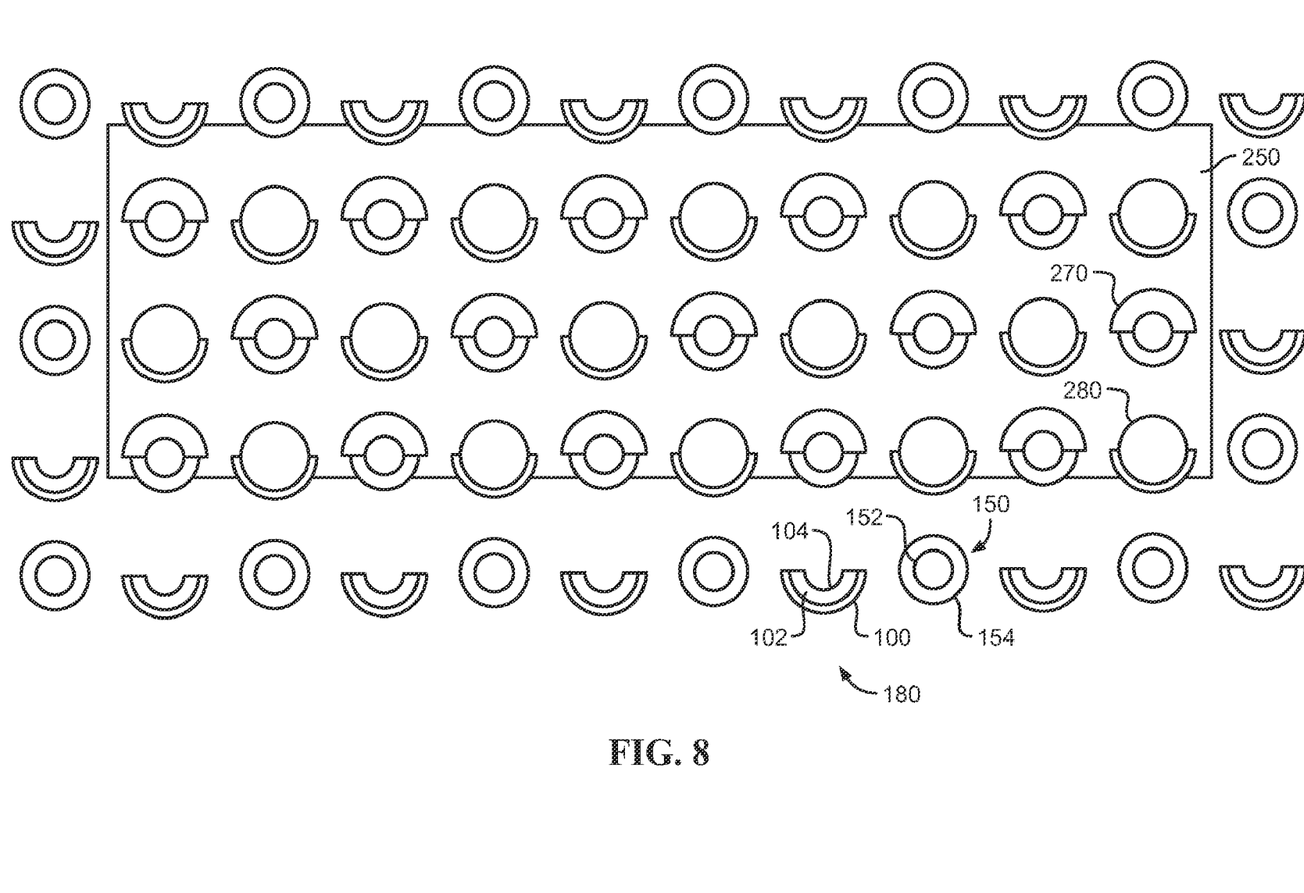
FIG. 8 is a perspective view of an object connected to a panel, employing the structure of FIGS. 1 and 2.

An example of an interconnection of an object to a panel is shown in FIG. 8. Panel 180 is shown from the back side and is transparent. It has posts 150 with flanges 152 connected to the panel via stems 154. Spaced from posts 150 are brackets 100 comprised of lip 104 and recessed region 102. Object array 250 is formed with mating and similarly formed posts 280 and brackets 270. As shown here, object array 250 has three parallel rows of posts and brackets which mate with three corresponding rows of brackets and posts on panel 180.

Figure 3:
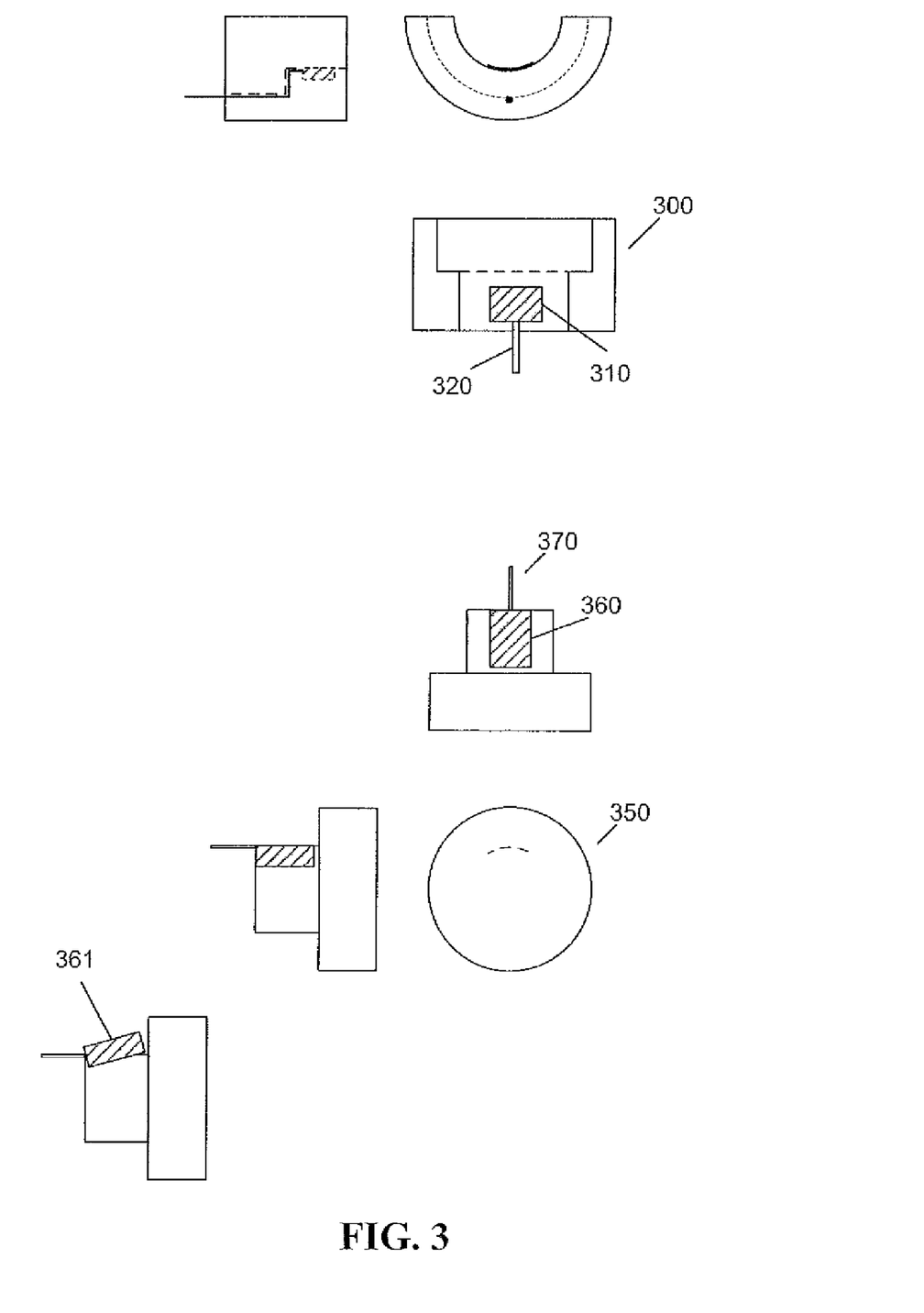
FIG. 3 shows various aspects of the brackets and posts of FIG. 1 with electrical contacts incorporated therewith.

FIG. 3 shows one embodiment of a bracket and post with electrical contacts. Bracket 300 has electrical contact 310 positioned on the inner surface of the lip. Pin 320 is used to connect contact 310 to a wire, wiring panel, or circuit board for distributing power. Contact 310 and pin 320 are preferably made from conductive material, for example, a copper alloy such as brass, bronze, beryllium-copper, or any other alloy, and can be plated with a minimally oxidizing or non-oxidizing layer, for example, tin, nickel, or gold to maintain surface conductivity. Contact 310 can be molded into bracket 300 or attached after bracket 300 is formed. Contact 310 can be installed after bracket 300 is assembled as part of a connector panel to which the bracket is attached, or it can be installed during the assembly of two portions of the bracket. Post 350 similarly has an electrical contact 360 with pin 370. Post 350 is intended to mate with bracket 300, where contact 360 meets contact 310. Electrical current for power or signaling is then passed between connectors. Contact 310 or 360 can be formed and attached to bracket 300 or post 350 to provide some spring displacement to assure a positive electrical contact is maintained. Such a spring displacement can be formed by slightly displacing one end of the contact 361 from the bracket or post, or by forming a hump or bulge in the contact.

Alternatively, the pins can be mounted on the wiring panel and the connector contact provided with an electrical connector socket for receiving the pin and providing electrical conduction. Then the entire wiring panel assembly with pins is connected to the connector panel where the array of pins engages the sockets in the array of connector elements.

Alternatively, the wiring panel can contain electrical connector sockets and accept the pin portion of the connector contacts. Other techniques can be used to create the connection between the wiring panel and the connector contacts. Various mechanical and electrical adapters incorporating the connector system can be created to enable legacy devices to interoperate with the present connector system. For example, an adapter can provide a standard two or three conductor power outlet.

Figure 4:
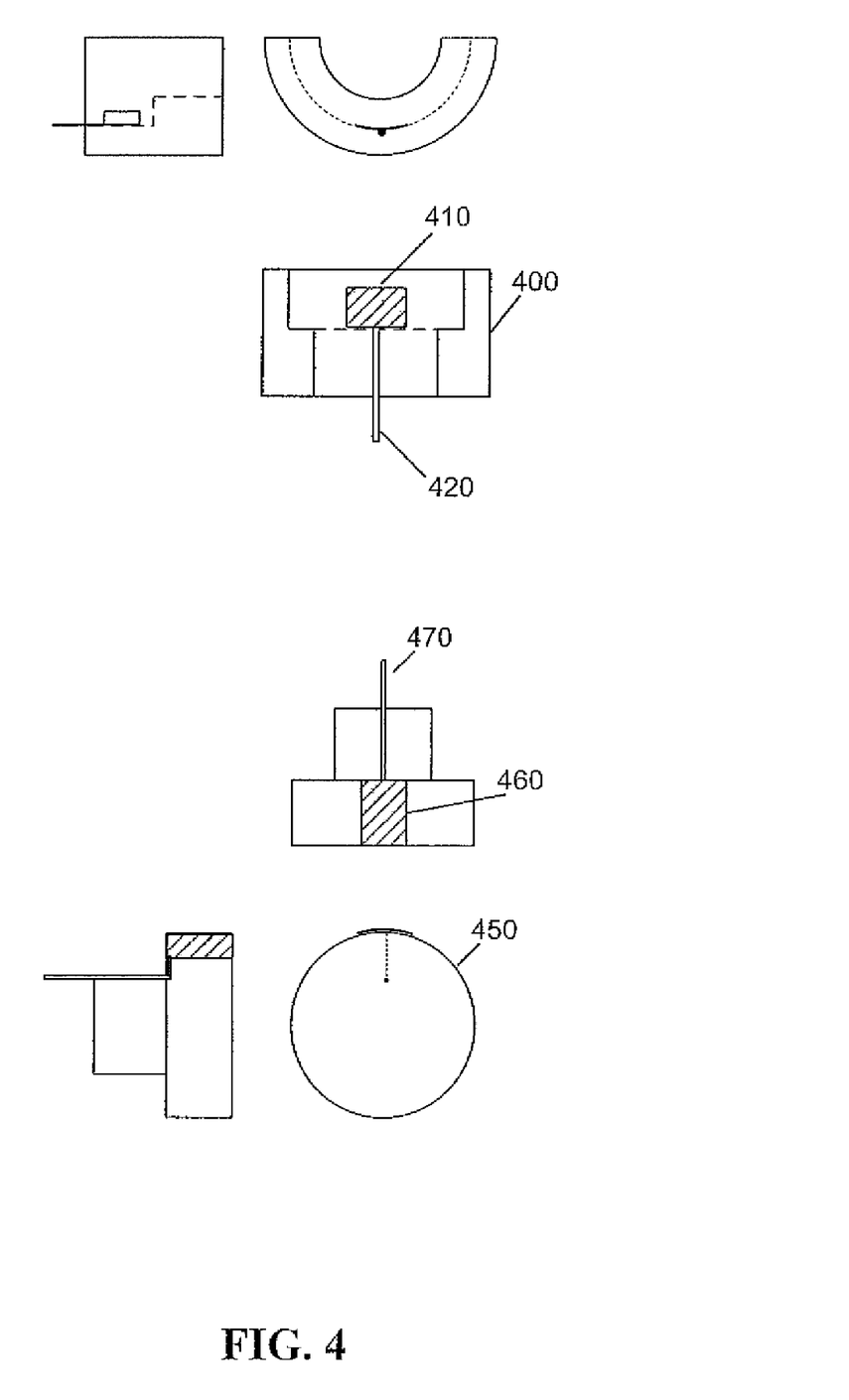
FIG. 4 depicts an alternative design of a bracket and post with electrical contact.

FIG. 4 shows another embodiment of a bracket and post with electrical contact. Contact 410 is positioned on the recessed region of bracket 400 and pin 420 provides a connection to a wire or circuit board. Post 450 has contact 460 positioned on the flange and pin 470 provides a connection to a wire or circuit board. Alternative embodiments to those shown in FIGS. 3 and 4 have the electrical contact surfaces tapered slightly to apply greater force to the electrical contact when the post is engaged with the correspondent bracket.

Figure 5:
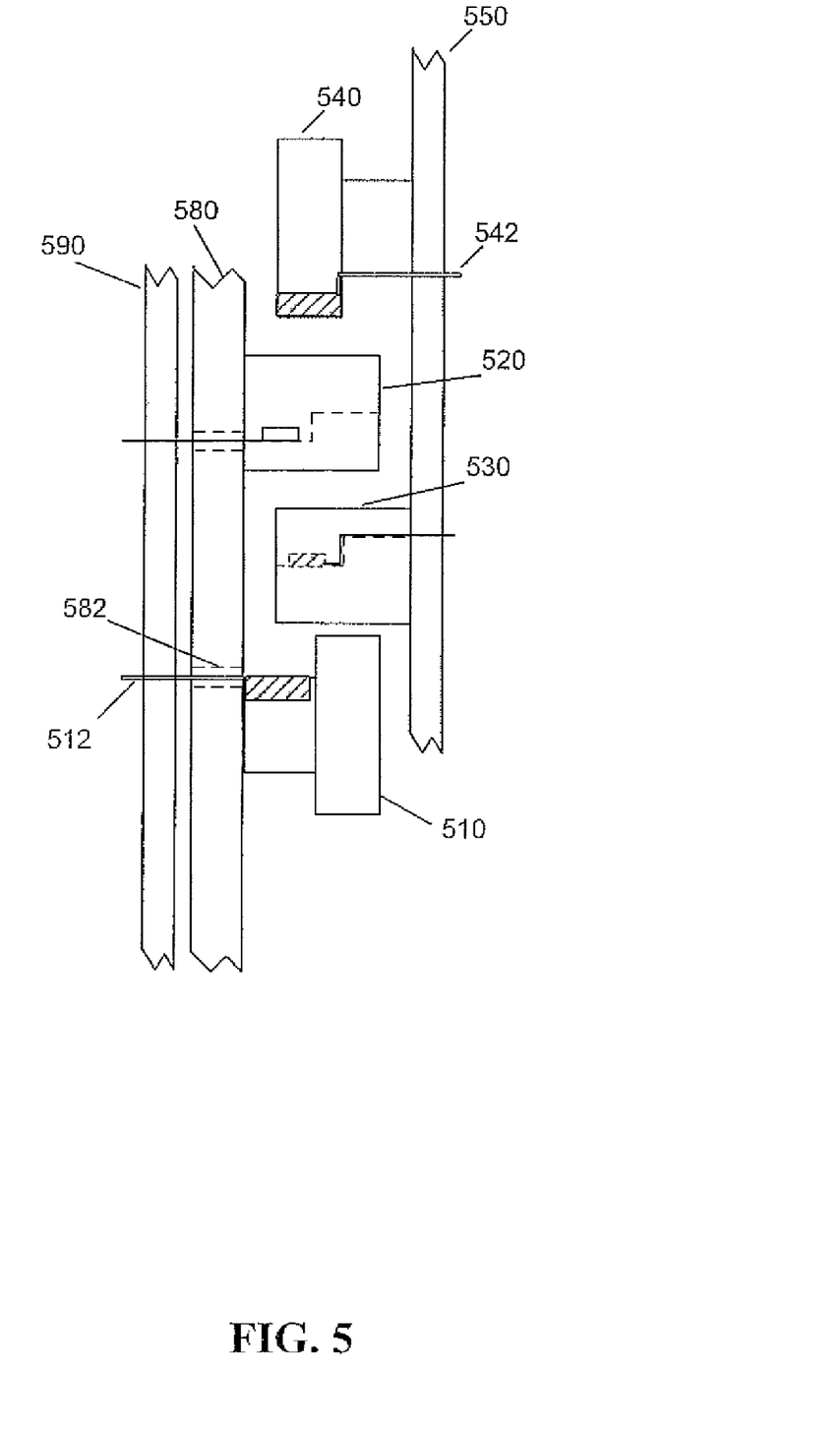
FIG. 5 shows a panel of FIGS. 3 and 4 connectors mating with connectors attached to an object.

FIG. 5 shows a panel of connectors 580 prepared for mating with connectors attached to an object 550 or an object connected to panel 550. In this figure, the connection of object 550 to panel 580 is made by moving the object downward so the flange tipped post 540 engages bracket 520 and bracket 530 engages post 510. In this embodiment, panel 580 is made from non-conductive material and provides the primary supporting structure for mounting brackets 520 and posts 510. Holes 582 allow pins 512 to pass through the panel 580 to make and electrical connection with a backplane, wiring panel, or circuit board 590. Circuit board 590 can be a printed circuit board that has conventionally formed traces to carry power and signals to pins 512. Circuit board 590 can contain active circuitry for switching of signals or power, fusing of connector contacts, or other circuitry. Power or signals are applied to circuit board 590 for distribution to some or all of the connectors. Object 550 mounted to the panel can be a circuit board similar to circuit board 590 or can be the housing of the object that has holes to enable pins 542 to pass through to an internal circuit board or wired connections. The brackets and posts of the object can be arranged in repeating patterns vertically as shown, or horizontally, or both. The number of bracket and posts with such electrical connectors utilized on the mounted object for carrying electrical current depends on the current or signal carrying needs of the object and the weight bearing capacity needed. Additional brackets and posts enable increased weight capacity but need not contain electrical connectors.

The electrical contacts shown in FIGS. 3, 4, and 5 are shown as single conductor contacts for purposes of simplicity in illustration. However, these contacts may also be multi-conductor contacts. For example, such multi-conductor contacts can be used for 32 bit or higher order data transmission. One or more of the multi-conductors may be ground conductors to provide the necessary interconnection of grounds between the panel and mounted objects. In one approach, a common ground strip may be incorporated into the panel in such a manner that individual mounted objects are grounded by contact between a ground contact on the mounted object with this ground strip.

One means for efficiently manufacturing a connector system incorporating electrical contacts such as described above is to use the methods of photolithographic deposition. In this process, the U-shaped brackets and the flange tipped posts with the electrical conductors are "grown" in a single fabrication sequence.

Figure 6:
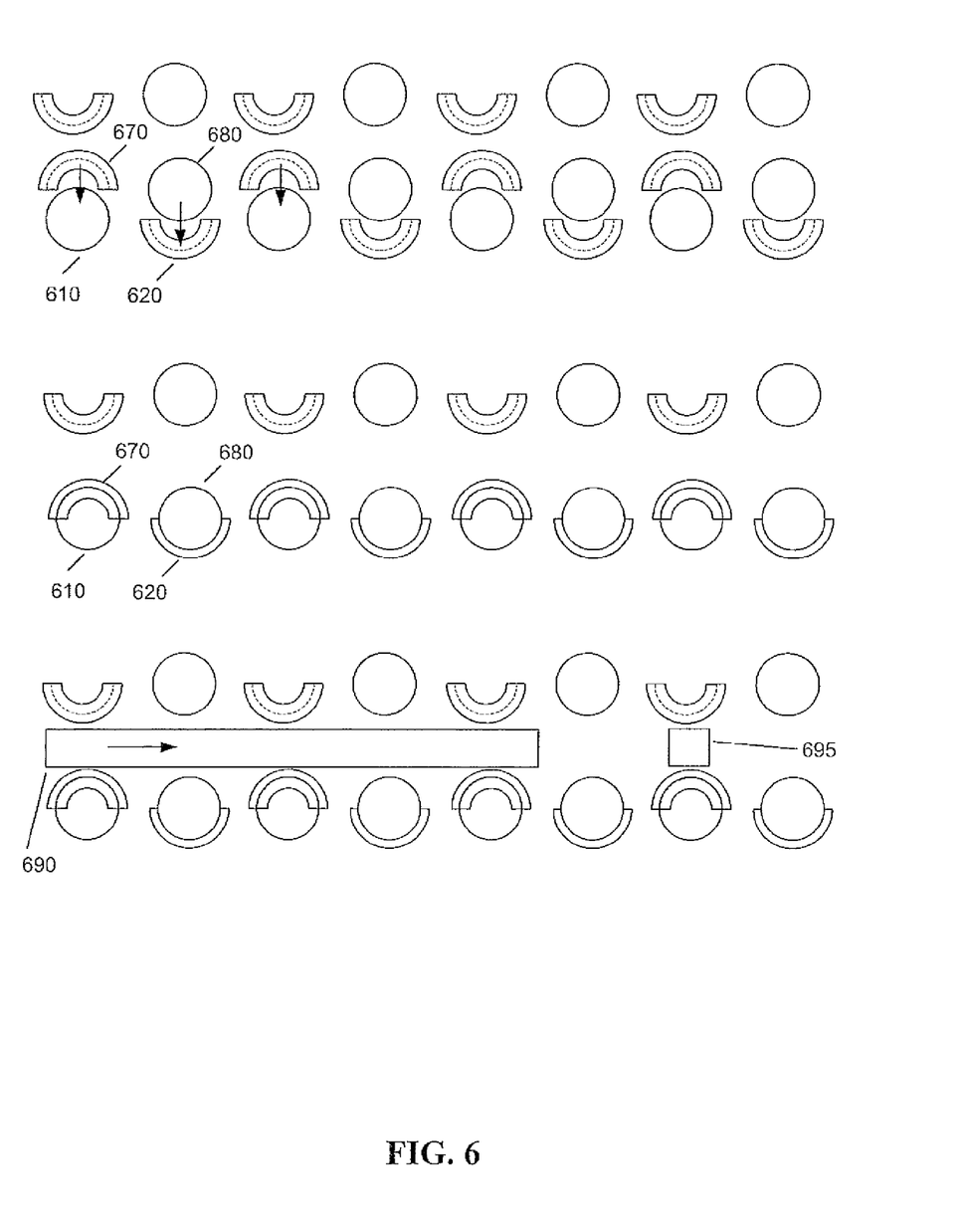
FIG. 6 shows the engagement of a row of connectors of FIG. 2 with an optional locking bar and locking button.

FIG. 6 shows the engagement of a row of connectors and an optional locking bar and locking button. Bracket 670 on the mounted object mates with post 610 on a panel and post 680 on the mounted object mates with bracket 620 on the panel. When the connectors are engaged by sliding downward as indicated by the arrows, a locking bar 690 can be inserted parallel to the connector panel plane between the rows to prevent upward movement of the object to prevent the disengagement of the mating of connectors. This is especially useful when the brackets and posts make electrical contact.

Alternatively, a locking button 695 can be installed in a mounted object in such manner that it may be retractably moved in a direction perpendicular to the plane of the panel. When the button is retracted to be below the surface of the mounted object, engagement and disengagement of that mounted object is freely undertaken. When the button 695 is moved out from below the surface of that object, that is, it projects outwardly from the object surface, disengagement of the mounted object is blocked by the button.

Figure 7:
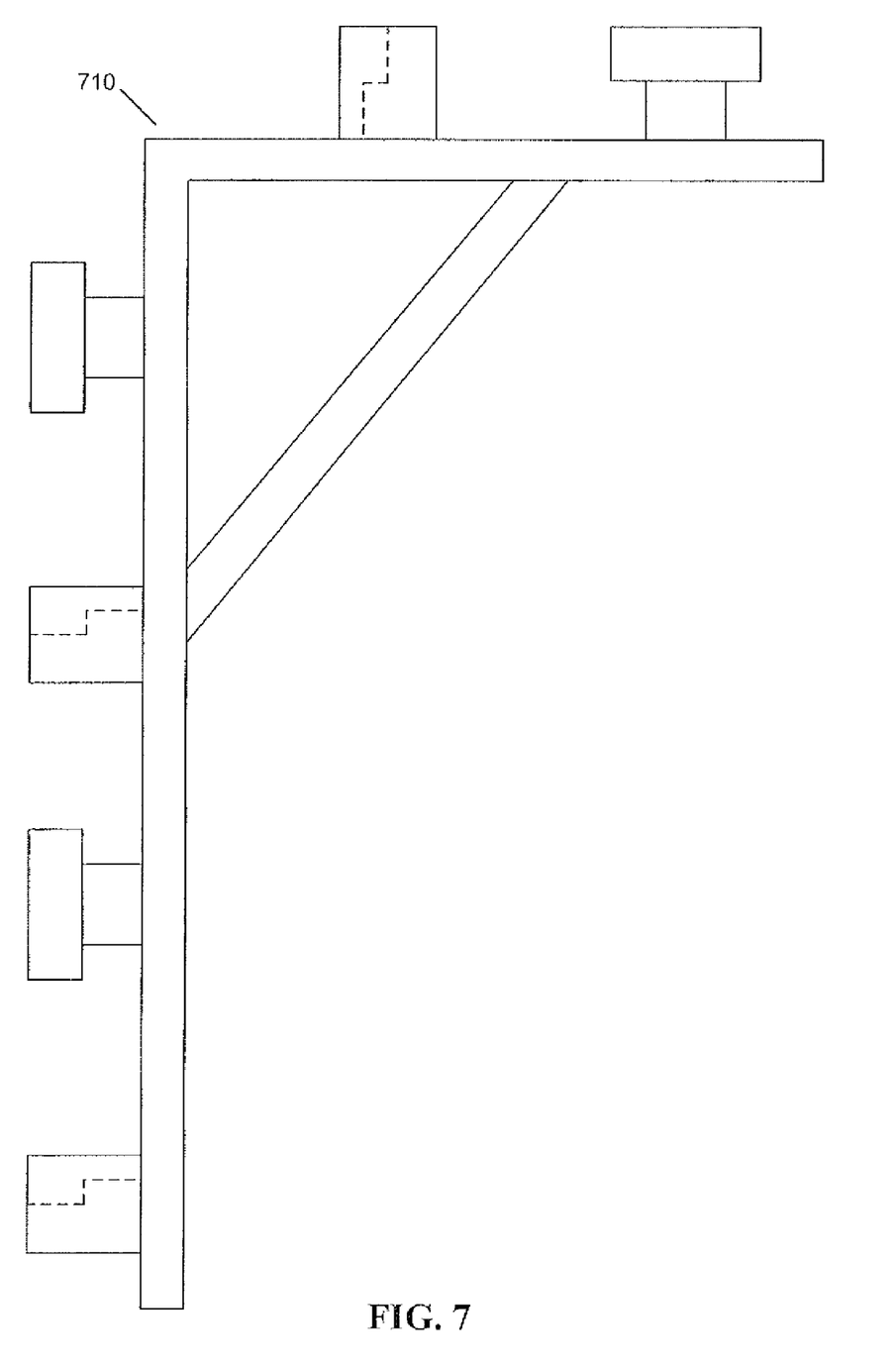
FIG. 7 depicts a shelf bracket suitable for mounting to a connector wall panel in accordance with the invention.

FIG. 7 shows a shelf bracket 710 suitable for mounting to a connector wall panel (not shown, but it could be panel 180 shown in FIG. 1). The vertical edge of the bracket engages with the connector wall panel. The horizontal surface can engage with a shelf that incorporates mating connectors. Electrical power can be routed through the bracket to deliver power to the shelf, which can have electrical connectors of any type to provide power to objects placed on the shelf.

Figure 9:
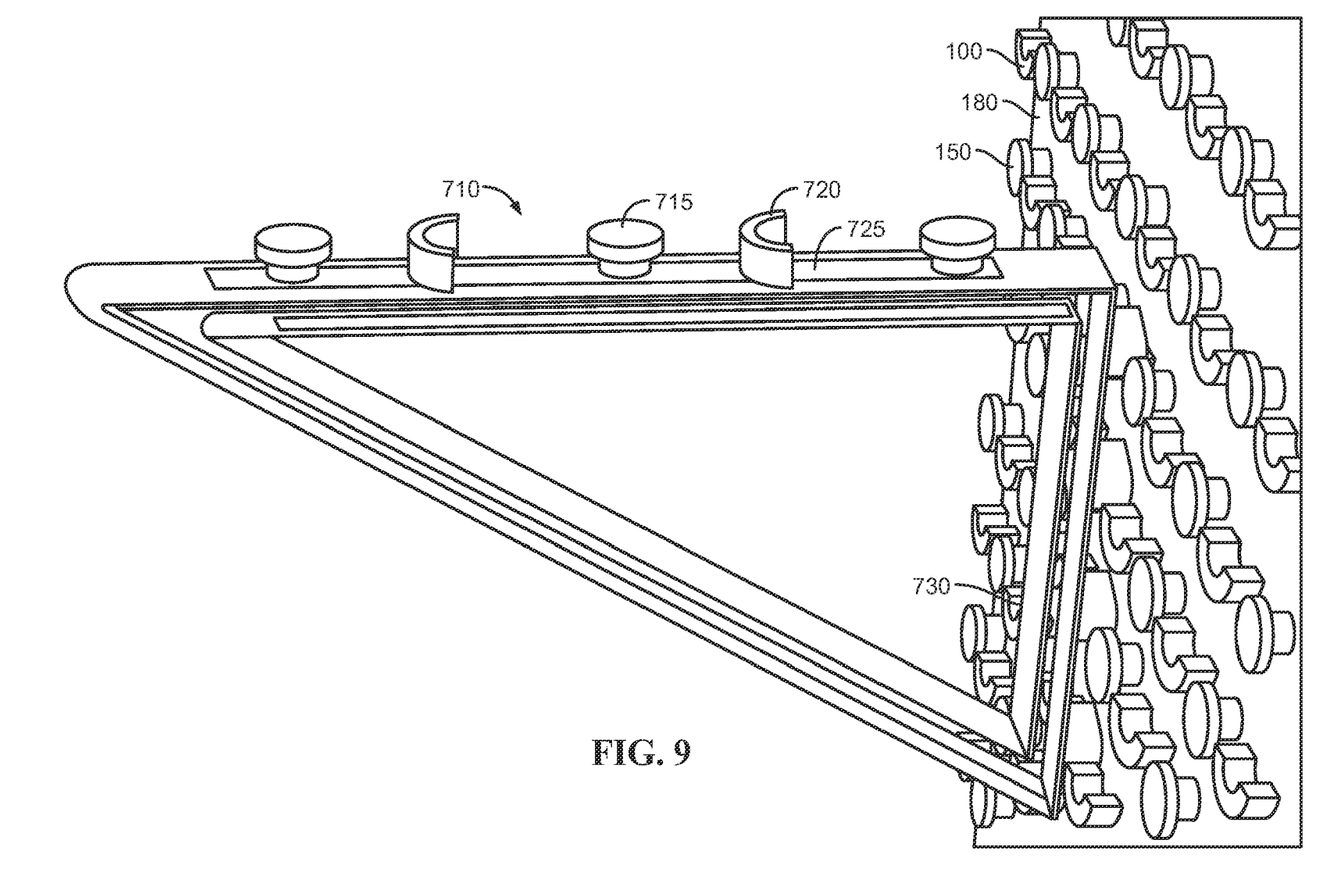
FIG. 9 is a perspective view of the shelf bracket of FIG. 7 connected to a panel having the bracket and post arrangement of FIGS. 1 and 2.

An example of an interconnection of a shelf bracket to a panel is shown in FIG. 9. Panel 180 is configured as before with multiple rows of alternating brackets 100 and posts 150, constructed as before described. Shelf bracket 710 is also formed with posts 715 and brackets 720 on shelf bracket leg or surface 725. Although not clearly shown in this figure, shelf bracket leg or surface 730 is also configured with alternating posts and brackets, as shown in FIG. 7. It is clear that shelf bracket 710 can be mounted in a variety of locations on panel 180.

In another embodiment of the connector system provided with electrical contacts, a retractable conductive rod can be incorporated into a flange tipped post on a mounted object. This rod is retracted when the post is not engaged with a U-shaped bracket. When the post is engaged with a bracket, the rod is extended to engage an electrical contact on a panel to which the bracket is attached. Alternatively, the rod can pass through a hole in the panel to contact a separate wiring circuit electrically isolated from the panel. With this configuration, the electrical terminal can convey an electrical voltage to the separate wiring circuit without exposing that voltage to inadvertent contact. An additional function of the retractable rod is that it constrains any sliding of the mating connector post relative to the bracket and thus prevents disengagement of the connectors.

Figure 10:
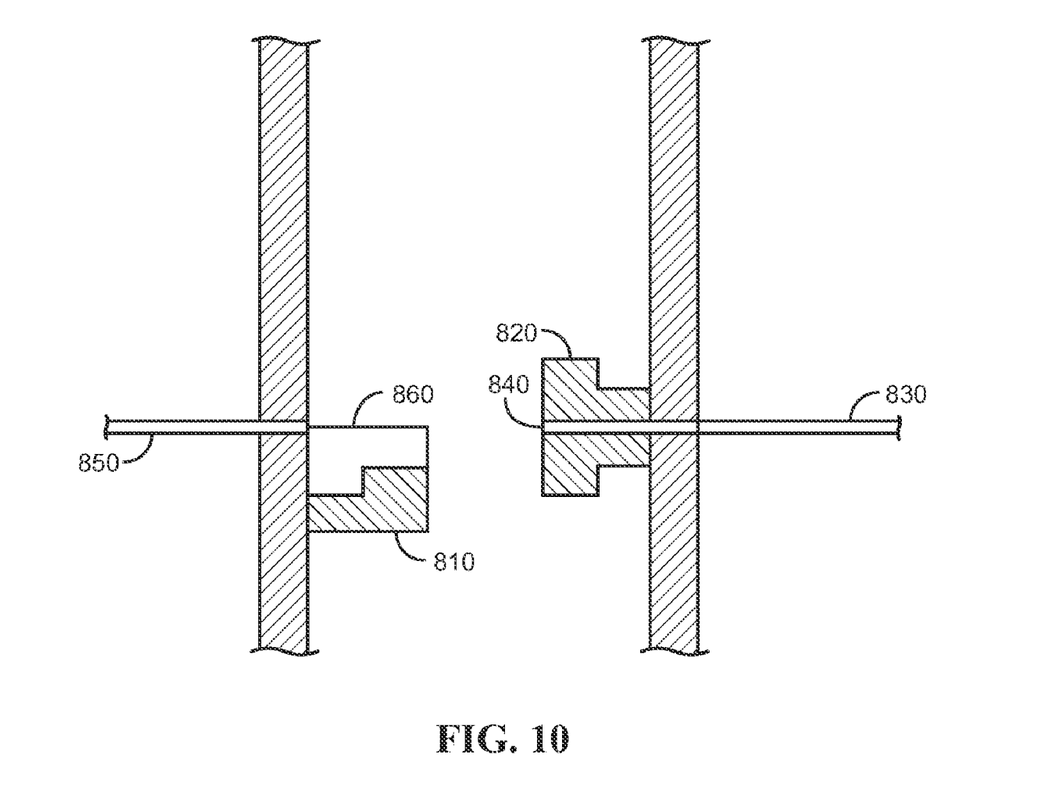
FIG. 10 is a schematic view of the bracket and post arrangement of FIGS. 1 and 2 with optical connections.

FIG. 10 shows an embodiment of the connector system which provides optical contact on a U-shaped bracket and a mating flange-tipped post for use in fiber optic communication networks. Optical contacts between two fiber optic conductors requires precise alignment of those conductors. By installing fiber optic cable 850 into and within the structures of bracket 810 and fiber optic cable 830 into and within the structure of corresponding post 820 so that the ends 840 and 860 of the cables are located at the same position on the mating surfaces of the bracket and post, optical signals may be transmitted from the cable within the bracket to that within the post and vice versa. The current invention is particular well suited for this embodiment owing to the self-alignment of the connections between all of the corresponding brackets and posts. The connection and signal distribution of the optical contacts are similar to those of the electrical connection.

In another embodiment of the connector system, connectors are attached to a sleeve that can be slipped over an automobile sun visor to provide mounting for objects such as sunglasses, compact disc containers, or mobile phone holders. The sleeve can be made from fabric and have stretchable regions.

In another embodiment of the connector system, connectors are attached to common products used in a shower, for example shampoo or soap bottles. The connectors on the products mate with connectors on a wall mounted panel to provide a hanging mechanism for the products.

In another embodiment of the connector system, an object has brackets and posts mounted on multiple surfaces of the object. This will permit the object to be attached to a second panel provided with corresponding brackets and posts in multiple orientations. For example, a small panel may have brackets and posts mounted on the flat portion of the panel as well as on the edges of the panel. This would enable this small panel to be attached to a larger panel so that the two panels are parallel or so that the smaller panel is oriented at right angles to the larger panel. This embodiment thus permits panels to be assembled as boxes, containers, and the like. An example of an edge connection is shown in FIG. 7, although the shelf bracket has no side bracket/post coupling elements. It should be noted that any two or more elements, whether termed objects or panels, of any actual or relevant size, may be interconnected to effectively build structures.

In another embodiment of the connector system, a single flange tipped post on a first object is inserted into a U-shaped bracket on a panel or other second object, allowing for the first object to pivot freely relative to the second object, thus providing for hinge-type movement.

In another embodiment of the connector system provided with electrical contacts, small arrays of light sources, for example LED bulbs, are mounted on panels provided with brackets and posts. These light panels can then be attached to any object incorporating the mating connector system with electrical contacts carrying the power required to operate the light sources to provide a desired concentration of lighting.

Although particular embodiments of the invention have been described in detail for purposes of illustration, various modifications and enhancements may be made without departing from the spirit and scope of the invention. Accordingly, the invention is not to be limited except as by the appended claims and reasonable equivalents.

What is claimed is:

1. A connector system comprising:
   a plurality of U-shaped flanged brackets and flange-tipped posts, the plurality of U-shaped flanged brackets and plurality of flange-tipped posts being attached to a supporting surface forming a first array, wherein each U-shaped flanged bracket of the first array is spaced apart from each flange-tipped post of the first array; and
   a second array comprising a plurality of U-shaped brackets and a plurality of flange-tipped posts arranged to respectively engage with corresponding flange-tipped posts and corresponding U-shaped flanged brackets of said first array;
   wherein the flange-tipped posts include:
   a stem extending directly from and perpendicularly to the supporting surface; and
   a flange extending directly from the stem, wherein a sidewall of the flange is perpendicular to the stem;

and wherein the U-shaped flanged brackets include:
a U-shaped sidewall extending directly from and perpendicularly to the supporting surface;
a flange extending directly from and perpendicular to the sidewall; and
a recess defined by the support surface, a concave part of the U-shaped sidewall and the flange.

2. The connector system of claim 1, wherein said second array is attached to an object such that said object may be attached to said first array by engagement of said corresponding brackets and posts.

3. The connector system of claim 2, wherein the object may be attached to said first array in at least two positions.

4. The connector system of claim 1, wherein said first array is a two-dimensional pattern of brackets and posts.

5. The connector system of claim 1, wherein said U-shaped flanged brackets and said flange-tipped posts are generally cylindrical in cross section.

6. The connector system of claim 1, wherein said supporting surface is planar.

7. The connector system of claim 1, wherein said supporting surface is non-planar.

8. The connector system of claim 1, wherein said supporting surface is flexible.

9. The connector system of claim 4, further comprising a locking bar to prevent disengagement of an engaged post and bracket.

10. The connector system of claim 4, further comprising a locking button located to prevent disengagement of an engaged post and bracket.

11. The connector system of claim 1, further comprising a first electrical contact located on at least one flange-tipped post of the first array, and a second electrical contact located on a corresponding at least one U-shaped flanged bracket of the second array.

12. The connector system of claim 11, further comprising a first electrical circuit attached to or integral with the supporting surface of said first array and in electrical communication with at least one of said electrical contacts affixed to said first array, and a second electrical circuit attached to or integral with said second array and in electrical communication with at least one of said electrical contacts affixed to said second array.

13. The connector system of claim 1, further comprising a first fiber optic cable passing through at least one flange-tipped post of the first array, and a second fiber optic cable passing through at least one U-shaped flanged bracket of the second array,
wherein the at least one flange-tipped post of the first array is engaged with the at least one U-shaped flanged bracket of the second array, and the first fiber optic cable and the second fiber optic cable are aligned such that an optical signal is transmitted between the first fiber optic cable and the second fiber optic cable.

14. A connector system comprising:
a repeating pattern of U-shaped flanged brackets and flange-tipped posts forming an array, wherein each of the U-shaped flanged brackets of the array is spaced apart from each of the flange-tipped posts of the array; and
a mating pair of U-shaped flanged brackets and flange-tipped posts that engage with the corresponding brackets and posts in said array;
wherein the flange-tipped posts include:
a stem extending directly from and perpendicularly to a supporting surface upon which the flange-tipped posts are disposed; and
a flange extending directly from the stem, wherein a sidewall of the flange is perpendicular to the stem;
and wherein the U-shaped flanged brackets include:
a U-shaped sidewall extending directly from and perpendicularly to a supporting surface upon which the U-shaped flanged brackets are disposed;
a flange extending directly from and perpendicular to the sidewall; and
a recess defined by the supporting surface, a concave part of the U-shaped sidewall and the flange.

15. A connector panel comprising a pattern of connector elements repeating in two dimensions, the connector elements comprising U-shaped flanged brackets and flange-tipped posts, wherein each of the U-shaped flanged brackets is spaced apart from each of the flange-tipped posts;
wherein the flange-tipped posts include:
a stem extending directly from and perpendicularly to the connector panel; and
a flange extending directly from the stem, wherein a sidewall of the flange is perpendicular to the stem;
and wherein the U-shaped flanged brackets include:
a U-shaped sidewall extending directly from and perpendicularly to the connector panel;
a flange extending directly from and perpendicular to the sidewall; and
a recess defined by the connector panel, a concave part of the U-shaped sidewall and the flange.

16. A shelf mounting system comprising:
a shelf mounting bracket with a first surface and a second surface perpendicular to each other and with at least one flanged bracket and at least one flange-tipped post attached to each of the first surface and the second surface; and
a connector panel, said connector panel being provided with a plurality of flanged brackets and a plurality of flange-tipped posts located to correspond to said flanged brackets and flange-tipped posts on said first surfaces of said shelf mounting bracket, wherein each of the flanged brackets of the connector panel is spaced apart from each of the flange-tipped posts of the connector panel;
wherein the flange-tipped posts include:
a stem extending directly from and perpendicularly to the first or second surface upon which the flange-tipped post is disposed; and
a flange extending directly from the stem, wherein a sidewall of the flange is perpendicular to the stem;
and wherein the U-shaped flanged brackets include:
a U-shaped sidewall extending directly from and perpendicularly to the first or second surface upon which the U-shaped flanged bracket is disposed;
a flange extending directly from and perpendicular to the sidewall; and
a recess defined by the first or second surface, a concave part of the U-shaped sidewall and the flange.

17. The shelf mounting system of claim 16, further comprising a shelf provided with flanged brackets and flange-tipped posts located to correspond to said flanged brackets and flange-tipped posts of said second surface of said shelf mounting bracket.

18. The connector system of claim 1, wherein the at least one U-shaped flanged bracket and the at least one flange-tipped post of the first array and the second array are made of rigid materials.

19. The connector system of claim 14, wherein one of the flange-tipped posts of the array is engaged with one of the U-shaped flanged brackets in the mating pair, and is spaced apart from any of the flange-tipped posts in the mating pair.

20. The connector system of claim 14, wherein the repeating pattern of U-shaped flanged brackets and flange-tipped posts and the mating pair of U-shaped flanged brackets and flange-tipped posts are made of rigid materials.

21. The connector panel of claim 15, wherein the U-shaped flanged brackets and the flange-tipped posts are made of rigid materials.

22. The connector system of claim 16, wherein one of the flange-tipped posts of the connector panel is engaged with the at least one U-shaped flanged bracket of the shelf mounting bracket, and is spaced apart from the at least one flange-tipped post of the shelf mounting bracket.

23. The connector system of claim 16, wherein the U-shaped flanged brackets and the flange-tipped posts of the shelf mounting bracket and the connector panel are made of rigid materials.

24. A connector system comprising:
a planar supporting surface;
at least one U-shaped flanged bracket attached to the supporting surface and at least one flange-tipped post attached to the supporting surface, wherein each U-shaped flanged bracket is disposed so that the U-shape lies parallel to the plane of the supporting surface; and
a second surface comprising at least one U-shaped bracket and at least one flange-tipped post arranged to respectively engage with a corresponding at least one flange-tipped post and a corresponding at least one U-shaped flanged brackets of the supporting surface;
wherein the flange-tipped posts include:
a stem extending directly from and perpendicularly to the supporting surface; and
a flange extending directly from the stem, wherein a sidewall of the flange is perpendicular to the stem;
and wherein the U-shaped flanged brackets include:
a U-shaped sidewall extending directly from and perpendicularly to the supporting surface;
a flange extending directly from and perpendicular to the sidewall; and
a recess defined by the support surface, a concave part of the U-shaped sidewall and the flange.

25. A connector system comprising:
a plurality of U-shaped flanged brackets and flange-tipped posts, the plurality of U-shaped flanged brackets and plurality of flange-tipped posts being attached to a supporting surface forming a first array, wherein each U-shaped flanged bracket of the first array is spaced apart from each flange-tipped post of the first array;
a second array comprising a plurality of U-shaped brackets and a plurality of flange-tipped posts arranged to respectively engage with corresponding flange-tipped posts and corresponding U-shaped flanged brackets of said first array;
a first fiber optic cable passing through at least one flange-tipped post of the first array; and
a second fiber optic cable passing through at least one U-shaped flanged bracket of the second array;
wherein the at least one flange-tipped post of the first array is engaged with the at least one U-shaped flanged bracket of the second array, and the first fiber optic cable and the second fiber optic cable are aligned such that an optical signal is transmitted between the first fiber optic cable and the second fiber optic cable.

* * * * *